(12) United States Patent
Liang et al.

(10) Patent No.: US 11,978,940 B2
(45) Date of Patent: May 7, 2024

(54) DIELECTRIC DUPLEXER

(71) Applicant: HUAWEI TECHNOLOGIES CO., LTD., Guangdong (CN)

(72) Inventors: Dan Liang, Shanghai (CN); Xiaofeng Zhang, Kista (SE); Guoshuai Zhao, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 17/357,696

(22) Filed: Jun. 24, 2021

(65) Prior Publication Data

US 2021/0320390 A1 Oct. 14, 2021

Related U.S. Application Data

(63) Continuation of application No. PCT/CN2019/128188, filed on Dec. 25, 2019.

(30) Foreign Application Priority Data

Dec. 26, 2018 (WO) ................ PCT/CN2018/123755

(51) Int. Cl.
    *H01P 1/20* (2006.01)
    *H01P 5/12* (2006.01)
    *H04B 1/40* (2015.01)

(52) U.S. Cl.
    CPC ............... *H01P 1/20* (2013.01); *H01P 5/12* (2013.01); *H04B 1/40* (2013.01)

(58) Field of Classification Search
    CPC . H01P 1/20; H01P 5/12; H01P 1/2136; H04B 1/40
    See application file for complete search history.

(56) References Cited

U.S. PATENT DOCUMENTS 6,340,921 B1   1/2002   Kuroda et al.
6,373,352 B1   4/2002   Lee et al.
(Continued)

FOREIGN PATENT DOCUMENTS

CN   1230036 A     9/1999
CN   201590466 U   9/2010
(Continued)

OTHER PUBLICATIONS

Office Action issued in Indian Application No. 202137029819 dated Mar. 9, 2022, 6 pages.
(Continued)

*Primary Examiner* — Andrea Lindgren Baltzell
*Assistant Examiner* — Kimberly E Glenn
(74) *Attorney, Agent, or Firm* — Fish & Richardson P.C.

(57) ABSTRACT

The present disclosure relates to dielectric duplexers. One example dielectric duplexer includes a dielectric body, where an input/output structure, a tap, a first resonance structure, and a second resonance structure are provided on surfaces of the dielectric body. The tap and the input/output structure are provided on different surfaces of the dielectric body. The tap and the input/output structure are located between the first resonance structure and the second resonance structure. A first resonator consists of the first resonance structure and the dielectric body around the first resonance structure, and a second resonator consists of the second resonance structure and the dielectric body around the second resonance structure. A conducting layer covers a surface of the input/output structure, the tap, the first resonance structure, and the second resonance structure, and the conducting layer covers the surface of the dielectric body except a region around the input/output structure.

20 Claims, 7 Drawing Sheets

(56) References Cited

U.S. PATENT DOCUMENTS

| | | |
|---|---|---|
| 9,559,399 B2 | 1/2017 | Yatabe |
| 2013/0049902 A1 | 2/2013 | Hendry et al. |
| 2016/0099492 A1 | 4/2016 | Yuan et al. |
| 2016/0301123 A1 | 10/2016 | Solomon et al. |
| 2017/0317657 A1 | 11/2017 | Hahn et al. |
| 2018/0191048 A1 | 7/2018 | Hou et al. |

FOREIGN PATENT DOCUMENTS

| | | | | |
|---|---|---|---|---|
| CN | 102097670 A | | 6/2011 | |
| CN | 102694220 A | | 9/2012 | |
| CN | 103138034 A | | 6/2013 | |
| CN | 103594762 A | | 2/2014 | |
| CN | 207624877 U | | 7/2018 | |
| CN | 111509338 A | * | 8/2020 | ............ H01P 1/2002 |
| EP | 0856902 B1 | | 12/2002 | |
| KR | 20030084352 A | | 11/2003 | |
| WO | 2018148905 A1 | | 8/2018 | |

OTHER PUBLICATIONS

PCT International Search Report and Written Opinion issued in International Application No. PCT/CN2018/123755 dated Aug. 28, 2019, 18 pages (with English translation).

PCT International Search Report and Written Opinion issued in International Application No. PCT/CN2019/128188 dated Mar. 16, 2020, 17 pages (with English translation).

Office Action issued in Chinese Application No. 201980086100.1 dated Oct. 15, 2021, 5 pages.

EP Communication Pursuant to Article 94(3) EPC in European Appln No. 19901643.7, dated Feb. 23, 2024, 6 pages.

* cited by examiner

DIELECTRIC DUPLEXER

CROSS-REFERENCE TO RELATED APPLICATIONS

This application is a continuation of International Application No. PCT/CN2019/128188, filed on Dec. 25, 2019, which claims priority to International Application No. PCT/CN2018/123755, filed on Dec. 26, 2018. The disclosures of the aforementioned applications are hereby incorporated by reference in their entireties.

TECHNICAL FIELD

This application relates to the communications field, and in particular, to a dielectric duplexer.

BACKGROUND

With rise of small cells in recent years, demands for miniaturized and lightweight duplexers are increasingly strong, and conventional cavity duplexers cannot meet requirements. Dielectric duplexers are gradually widely used due to their small size and light weight.

A dielectric duplexer is formed by coupling several dielectric resonators. In the dielectric duplexer, a metal conductor is replaced with a dielectric (such as a microwave ceramic), so that an electromagnetic field can be confined within a resonant cavity and a loss is relatively low. In a conventional technology, in a form of the dielectric duplexer, a tapping (tapping) design of the duplexer is performed by using a waveguide port (waveguide port), and phase matching is performed by using a waveguide transmission line. A duplexer tap is a structure for combining two paths of signals or dividing signals into two paths for transmission. A tap using a waveguide port structure can adjust amplitude and a phase of a signal by adjusting lengths of waveguide sections on two sides of an input end, to meet a signal transmission requirement.

However, in this design manner, to implement phase matching, a distance between the tap and a receive-end resonator and a distance between the tap and a transmit-end resonator are usually relatively large. Consequently, an overall size of the dielectric duplexer is relatively large, and production costs are relatively high.

SUMMARY

Embodiments of this application provide a dielectric duplexer, so that an overall size of a duplexer can be made smaller, to reduce production costs.

According to a first aspect, the embodiments of this application provide a dielectric duplexer. The dielectric duplexer includes a dielectric body, where an input/output structure, a tap, a first resonance structure, and a second resonance structure are provided on the dielectric body, the tap, the input/output structure, the first resonance structure, and the second resonance structure are all cavities provided on surfaces of the dielectric body, the tap and the input/output structure are provided on different surfaces of the dielectric body, the tap and the input/output structure are located between the first resonance structure and the second resonance structure, a first resonator consists of the first resonance structure and the dielectric body around the first resonance structure, and a second resonator consists of the second resonance structure and the dielectric body around the second resonance structure, where a conducting layer covers surfaces of the input/output structure, the tap, the first resonance structure, and the second resonance structure, and the conducting layer covers the surfaces of the dielectric body except a region around the input/output structure;

the input/output structure is configured to input a signal or output a signal;

the tap is configured to couple a signal from the input/output structure to the first resonator and the second resonator, or the tap is configured to couple a signal from the first resonator and a signal from the second resonator to the input/output structure; and the first resonator and the second resonator are configured to filter a signal.

In this implementation, the tap is of a cavity structure along the surface of the dielectric body, and signal coupling between the tap and a resonator can be adjusted by adjusting a depth or an aperture size of the tap, to implement phase matching without adjusting a distance between the tap and the resonator. Therefore, the distance between the tap and the resonator can be designed to be short, so that an overall size of the duplexer can be made smaller, to reduce production costs.

Optionally, in some possible implementations, resonance frequencies of the first resonator and the second resonator are different.

In this implementation, because the resonance frequencies of the first resonator and the second resonator are different, the first resonator and the second resonator may separately filter a signal based on the resonance frequencies of the first resonator and the second resonator, to obtain, through filtering, signals that conform to respective frequency requirements.

Optionally, in some possible implementations, the tap is specifically configured to couple an input signal of the input/output structure to the first resonator and the second resonator;

the first resonator is specifically configured to filter the input signal to obtain a first signal; and the second resonator is specifically configured to filter the input signal to obtain a second signal, where frequencies of the second signal and the first signal are different.

In this implementation, functions of the components in the dielectric duplexer in this embodiment are described from a signal direction in which the input/output structure inputs a signal. The dielectric duplexer designed based on the structure described in this embodiment of this application can work normally, thereby improving practicability of this solution.

Optionally, in some possible implementations, the first resonator is specifically configured to obtain a third signal;

the second resonator is specifically configured to obtain a fourth signal, where frequencies of the fourth signal and the third signal are different;

the tap is specifically configured to couple the third signal and the fourth signal to the input/output structure; and the input/output structure is specifically configured to output the third signal and the fourth signal.

In this implementation, functions of the components in the dielectric duplexer in this embodiment are described from a signal direction in which the input/output structure outputs signals, to further improve practicability and flexibility of this solution.

Optionally, in some possible implementations, the input/output structure is provided on a first surface of the dielectric body, the tap is provided on a second surface of the dielectric body, the first resonance structure is provided on the first surface or the second surface, the second resonance structure is provided on the first surface or the second surface, and the first surface is parallel to the second surface.

In this implementation, the tap, the first resonance structure, and the second resonance structure may be provided on a same surface of the dielectric body, or on different surfaces of the dielectric body. A plurality of different combination forms are listed above, to improve expandability of this solution.

Optionally, in some possible implementations,
the tap is in communication with a third surface or a fourth surface of the dielectric body, and the third surface and the fourth surface are perpendicular to the first surface.

In this implementation, the tap may be provided on the second surface and be in communication with the third surface or the fourth surface. To be specific, a structure of the tap may start to be hollowed out along the second surface, and is further hollowed out toward the third surface or the fourth surface, to form a structure in a shape similar to "L", to further improve expandability of this solution.

Optionally, in some possible implementations,
at least one adjusting structure is further provided on the dielectric body, and the adjusting structure is configured to adjust signal coupling between the tap and the first resonator and/or signal coupling between the tap and the second resonator.

In this implementation, the signal coupling between the tap and the first resonance structure and the signal coupling between the tap and the second resonance structure can be simultaneously adjusted by adjusting the structure of the tap. The signal coupling between the tap and the first resonance structure and/or the signal coupling between the tap and the second resonance structure may be further adjusted by providing the at least one adjusting structure on the dielectric body, making an adjustable range of the signal coupling larger.

Optionally, in some possible implementations,
the at least one adjusting structure includes a first adjusting structure, the first adjusting structure is located between the tap and the first resonance structure, and the first adjusting structure is configured to adjust the signal coupling between the tap and the first resonator; and/or
the at least one adjusting structure includes a second adjusting structure, the second adjusting structure is located between the tap and the second resonance structure, and the second adjusting structure is configured to adjust the signal coupling between the tap and the second resonator.

In this implementation, a positional relationship between the first adjusting structure and the tap and the first resonance structure and a positional relationship between the second adjusting structure and the tap and the second resonance structure are listed, to improve practicability of this solution.

Optionally, in some possible implementations,
the first adjusting structure is a through hole provided on the dielectric body; or the first adjusting structure is a cavity provided on the dielectric body, and the first adjusting structure is provided on a surface different from surfaces on which the input/output structure, the first resonance structure, and the second resonance structure are provided; or the first adjusting structure is a first through groove provided on the dielectric body, where the first through groove is in communication with the tap and the first resonance structure.

In this implementation, a plurality of possible structural forms of the first adjusting structure are listed, to improve expandability of this solution.

Optionally, in some possible implementations,
the second adjusting structure is a through hole provided on the dielectric body; or the second adjusting structure is a cavity provided on the dielectric body, and the second adjusting structure is provided on a surface different from the surfaces on which the input/output structure, the first resonance structure, and the second resonance structure are provided; or the second adjusting structure is a second through groove provided on the dielectric body, where the second through groove is in communication with the tap and the second resonance structure.

In this implementation, a plurality of possible structural forms of the second adjusting structure are listed based on the plurality of structural forms of the first adjusting structure, to improve expandability of this solution.

Optionally, in some possible implementations,
the tap is in communication with the input/output structure.

In this implementation, the tap may or may not be in communication with the input/output structure. Considering from a perspective of production and processing, communication between the tap and the input/output structure more facilitates processing.

Optionally, in some possible implementations,
the first resonance structure, the second resonance structure, and the tap may be arranged on a straight line, or may not be arranged on a straight line.

Optionally, in some possible implementations,
the dielectric duplexer may further include more resonance structures such as a third resonance structure, for separating or combining more than two paths of signals.

Optionally, in some possible implementations,
the first resonator is further configured to suppress a signal outside a signal passband of the second resonator, to improve a filtering effect of the second resonator for an undesired signal; and the second resonator is further configured to suppress a signal outside a signal passband of the first resonator, to improve a filtering effect of the first resonator for an undesired signal.

In the technical solutions provided in the embodiments of this application, the dielectric duplexer includes the dielectric body. A transceiver terminal, the tap, a first filter, and a second filter are provided in the dielectric body. The first filter includes at least the first resonator. The second filter includes at least the second resonator. The tap is of a hollow-out structure along the surface of the dielectric body. The transceiver terminal, the first resonator, and the second resonator are all cavities provided in a height direction of the dielectric body. The tap and the transceiver terminal are located between the first resonator and the second resonator. In the foregoing manner, the tap is of a cavity structure along the surface of the dielectric body, and signal coupling between the tap and a resonator can be adjusted by adjusting a depth or an aperture size of the tap, to implement phase matching without adjusting a distance between the tap and the resonator. Therefore, the distance between the tap and the resonator can be designed to be short, so that an overall size of the duplexer can be made smaller, to reduce production costs.

DESCRIPTION OF EMBODIMENTS

Embodiments of this application provide a dielectric duplexer. A tap is of a cavity structure along a surface of a dielectric body, and signal coupling between the tap and a resonator can be adjusted by adjusting a depth or an aperture size of the tap, to implement phase matching without adjusting a distance between the tap and the resonator. Therefore, the distance between the tap and the resonator can be designed to be short, so that an overall size of the duplexer can be made smaller, to reduce production costs.

In the specification, claims, and the accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units clearly listed, but may include other steps or units not expressly listed or inherent to such a process, method, system, product, or device.

The embodiments of this application may be applied to a communications apparatus including a duplexer. The communications apparatus can support full-duplex work, namely, simultaneous work of receiving and sending, and a transmitter and a receiver do not affect normal work of each other. Specifically, the communications apparatus may be a network device or a terminal device. The network device may be an evolved NodeB (Evolutional Node B, eNB or e-NodeB for short), a macro base station, a micro base station (also referred to as a "small cell"), a picocell base station, an access point (Access Point, AP), a transmission point (Transmission Point, TP), a gNodeB (new generation Node B, new generation NodeB), or the like in long term evolution (long term evolution, LTE), a new radio (new radio, NR) system, or a licensed assisted access long-term evolution (Authorized auxiliary access long-term evolution, LAA-LTE) system. The terminal device may be referred to as a terminal device (User Equipment, UE), a mobile station (Mobile Station, MS), a mobile terminal (Mobile Terminal), an intelligent terminal, or the like. The terminal device may communicate with one or more core networks by using a radio access network (Radio Access Network, RAN). For example, the terminal device may be a mobile phone (or also referred to as a "cellular" phone), a computer with a mobile terminal, and the like. The terminal device may be a portable, pocket-size, handheld, computer-integrated or in-vehicle mobile apparatus, and the terminal device in the future NR network, which exchanges voice and/or data with the radio access network.

Figure 1:
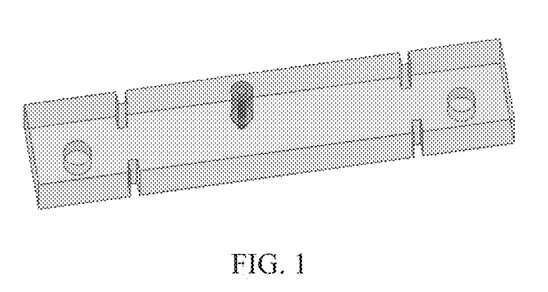
FIG. 1 is a schematic diagram of a dielectric duplexer of a tapping design by using a waveguide port form in a conventional technology.

Because demands for miniaturized and lightweight duplexers are increasingly strong currently, dielectric duplexers are gradually widely used due to their small size and light weight. A dielectric duplexer is formed by coupling several dielectric resonators. As shown in FIG. 1, in a form of a dielectric duplexer in a conventional technology, a tapping design of the duplexer is performed by using a waveguide port, and phase matching is performed by using a waveguide transmission line. A duplexer tap is a structure for combining two paths of signals or dividing signals into two paths for transmission. A tap using a waveguide port structure can adjust amplitude and a phase of a signal by adjusting lengths of waveguide sections on two sides of an input end, to meet a signal transmission requirement. However, in this design manner, to implement phase matching, a distance between the tap and a receive-end resonator and a distance between the tap and a transmit-end resonator are usually relatively large. Consequently, an overall size of the dielectric duplexer is relatively large, and production costs are relatively high.

Therefore, this application provides a dielectric duplexer, so that an overall size of a dielectric duplexer can be made smaller, to reduce production costs.

Figure 2:
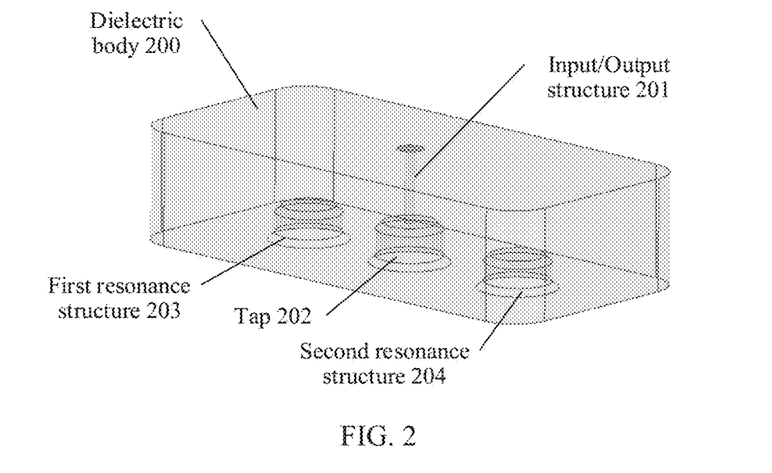
FIG. 2 is a schematic structural diagram of a dielectric duplexer according to an embodiment of this application.

FIG. 2 is a schematic structural diagram of a dielectric duplexer according to an embodiment of this application. Referring to FIG. 2, the dielectric duplexer includes a dielectric body 200. An input/output structure 201, a tap 202, a first resonance structure 203, and a second resonance structure 204 are provided on the dielectric body 200. The tap 202, the input/output structure 201, the first resonance structure 203, and the second resonance structure 204 are all cavities provided on surfaces of the dielectric body 200. The tap 202 and the input/output structure 201 are provided on different surfaces of the dielectric body, and the tap 202 and the input/output structure 201 are located between the first resonance structure 203 and the second resonance structure 204.

It should be noted that, a first resonator may consist of the first resonance structure and the dielectric body around the first resonance structure, and a second resonator may consist of the second resonance structure and the dielectric body around the second resonance structure. The first resonator and the second resonator may be respectively a resonator of a receive end and a resonator of a transmit end in the dielectric duplexer. Moreover, in addition to the first resonance structure 203 shown in FIG. 2, the first resonator may further include at least one another resonance structure of a structure similar to that of the first resonance structure 203. The first resonance structure 203 is a resonance structure closest to the tap 202 in the first resonator. Similarly, in addition to the second resonance structure 204 shown in FIG. 2, the second resonator may further include at least one another resonance structure of a structure similar to that of the second resonance structure 204. The second resonance structure 204 is a resonance structure closest to the tap 202 in the second resonator.

It should be noted that a conducting layer covers surfaces of the input/output structure 201, the tap 202, the first resonance structure 203, and the second resonance structure 204. The conducting layer may play a part in shielding a signal. The conducting layer covers the surfaces of the dielectric body 200 except a partial region around the input/output structure 201. For example, as shown in FIG. 2, a region around an opening of the input/output structure 201 on the surface of the dielectric body 200 is not covered with the conducting layer. The conducting layer of the partial region around the input/output structure 201 is etched to avoid interference of the conducting layer on signal receiving and sending of the input/output structure 201. The conducting layer is usually made of a material of metal silver. Certainly, the conducting layer in this embodiment may alternatively use other metal materials. This is not specifically limited herein.

In addition, the dielectric body 200 is usually of a cuboid structure shown in FIG. 2. Certainly, the dielectric body 200 may alternatively be of another structure such as a cube. This is not specifically limited herein. There may be a plurality of forms of cavity structures of the input/output structure 201, the tap 202, the first resonance structure 203, and the second resonance structure 204. For example, the cavity structure may be a cylindrical cavity or a cuboid structure. This is not specifically limited herein. It may be understood that, an aperture of the input/output structure 201 on the dielectric body 200 is usually less than apertures of the tap 202, the first resonance structure 203, and the second resonance structure 204 on the dielectric body 200, to facilitate the input/output structure 201 in inputting a signal or outputting a signal.

Functions of the components in the foregoing dielectric duplexer are described below.

The input/output structure 201 is configured to input a signal or output a signal. The tap 202 is configured to couple a signal from the input/output structure 201 to the first resonator and the second resonator, or the tap 202 is configured to couple a signal from the first resonator and a signal from the second resonator to the input/output structure 201. The first resonator and the second resonator are configured to filter signals respectively received by the first resonator and the second resonator. It may be understood that, resonance frequencies of the first resonator and the second resonator are usually different, so that the first resonator and the second resonator may separately obtain, through filtering based on the respective resonance frequencies, signals that conform to respective frequency requirements. Certainly, in some cases, the resonance frequencies of the first resonator and the second resonator may alternatively be the same. This is not specifically limited herein.

The functions of the foregoing components are further described below respectively from two different signal directions; a signal direction in which the input/output structure 201 inputs a signal and a signal direction in which the input/output structure 201 outputs signals.

First, the input/output structure 201 inputs a signal, and further the input/output structure 201 transmits the input signal to the tap 202 in a manner of electromagnetic wave coupling. Next, the tap 202 couples the input signal to the first resonator and the second resonator. The first resonator may filter the input signal to obtain a first signal. The second resonator may filter the input signal to obtain a second signal. Frequencies of the first signal and the second signal are different.

Second, the first resonator transmits a third signal obtained by the first resonator to the tap 202, and the second resonator transmits a fourth signal obtained by the second resonator to the tap 202. Frequencies of the third signal and the fourth signal are different. Next, the tap 202 couples the third signal and the fourth signal to the input/output structure 201, and the input/output structure 201 outputs the third signal and the fourth signal.

Figure 3:
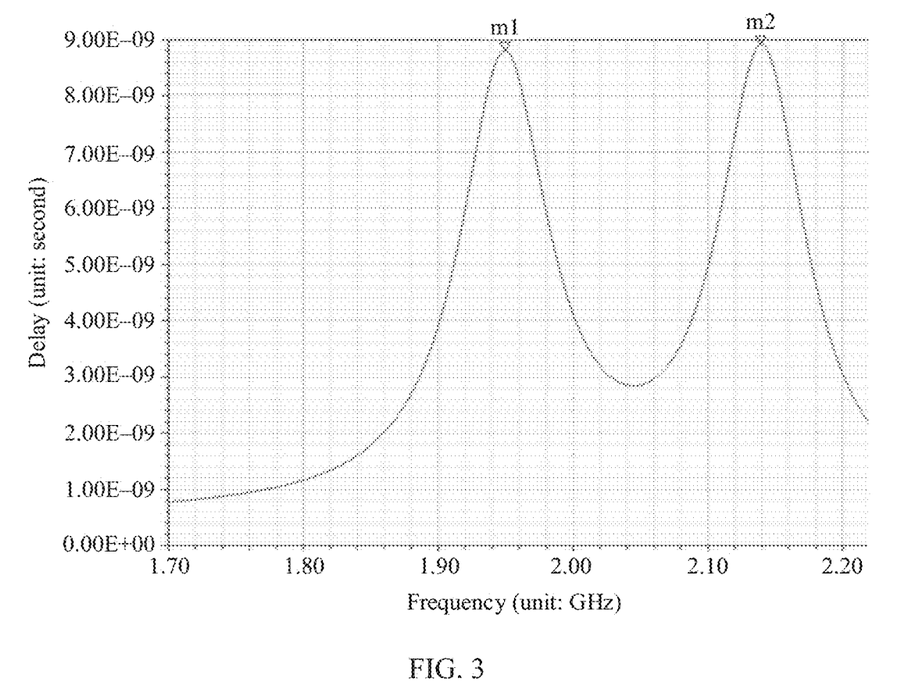
FIG. 3 is a diagram of signal delay simulation implemented based on a structure of a dielectric duplexer according to an embodiment of this application.

It should be noted that, in this embodiment, signal coupling between the tap and the first resonance structure and signal coupling between the tap and the second resonance structure may be simultaneously adjusted by adjusting a depth or an aperture of the tap 202, to adjust amplitude and a phase of a signal, to meet a signal transmission requirement. Specifically, a larger depth of the tap indicates larger signal coupling between the tap and the first resonance structure and larger signal coupling between the tap and the second resonance structure, and a larger aperture of the tap indicates larger signal coupling between the tap and the first resonance structure and larger signal coupling between the tap and the second resonance structure. It may be understood that, larger signal coupling between the tap and any resonance structure indicates a smaller signal delay between the tap and the resonance structure, namely, a shorter time required for a signal to be coupled from the tap to the resonance structure. FIG. 3 is a diagram of signal delay simulation implemented based on a structure of the dielectric duplexer in this embodiment. A horizontal coordinate represents a resonance frequency (unit: GHz) of a resonator, and a vertical coordinate represents a delay of signal coupling between the tap and a resonance structure. For example, a coordinate M1 in FIG. 3 represents that when a current resonance frequency of the first resonator is 1.96 GHz, a time required for a signal to be coupled from the tap to the first resonance structure is 8.8 seconds, and a coordinate M2 in FIG. 3 represents that when a current resonance frequency of the second resonator is 2.14 GHz, a time required for a signal to be coupled from the tap to the second resonance structure is 8.9 seconds.

In this embodiment of this application, the tap is of a cavity structure along the surface of the dielectric body, and signal coupling between the tap and a resonator can be adjusted by adjusting a depth or an aperture size of the tap, to implement phase matching without adjusting a distance between the tap and the resonator. Therefore, the distance between the tap and the resonator can be designed to be short, so that an overall size of the duplexer can be made smaller, to reduce production costs.

Figure 4:
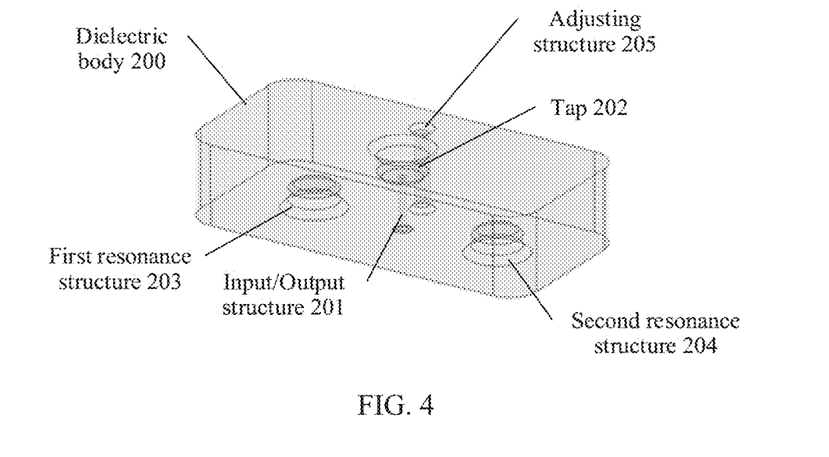
FIG. 4 is a schematic structural diagram of another dielectric duplexer according to an embodiment of this application.

Optionally, referring to FIG. 4, at least one adjusting structure 205 may be further provided on the dielectric body 200. The adjusting structure is configured to adjust the signal coupling between the tap and the first resonator and/or the signal coupling between the tap and the second resonator. It may be understood that, the signal coupling between the tap and the first resonance structure and the signal coupling between the tap and the second resonance structure can be simultaneously adjusted by adjusting the structure of the tap. Based on this, the at least one adjusting structure may further adjust the signal coupling between the tap and the first resonator, or the at least one adjusting structure may adjust the signal coupling between the tap and the second resonator, or the at least one adjusting structure adjusts the signal coupling between the tap and the first resonator, and another at least one adjusting structure adjusts the signal coupling between the tap and the second resonator. In the foregoing manner, the signal coupling between the tap and the first resonance structure and/or the signal coupling between the tap and the second resonance structure may be further adjusted by providing the at least one adjusting structure on the dielectric body, making an adjustable range of the signal coupling larger.

The following further describes the dielectric duplexer in this application with reference to a plurality of different structural forms of the adjusting structure.

Figure 4A:
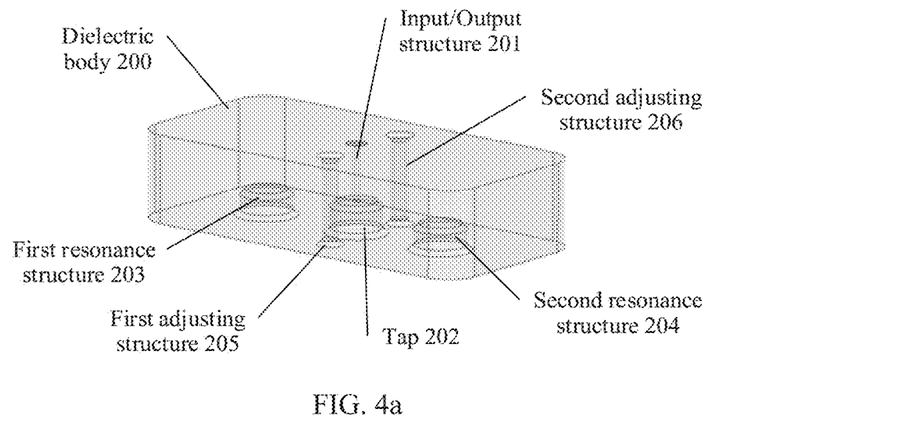
FIG. 4a is a schematic structural diagram of another dielectric duplexer according to an embodiment of this application.

Optionally, referring to FIG. 4a, a first adjusting structure 205 and a second adjusting structure 206 are provided on the dielectric body 200. The first adjusting structure 205 and the second adjusting structure 206 are both through holes provided on the surface of the dielectric body 200. The first adjusting structure 205 is located between the tap 202 and the first resonance structure 203. The second adjusting structure 206 is located between the tap 202 and the second resonance structure 204. The first adjusting structure 205 is configured to adjust the signal coupling between the tap 202 and the first resonator. The second adjusting structure 206 is configured to adjust the signal coupling between the tap 202 and the second resonator.

Figure 4B:
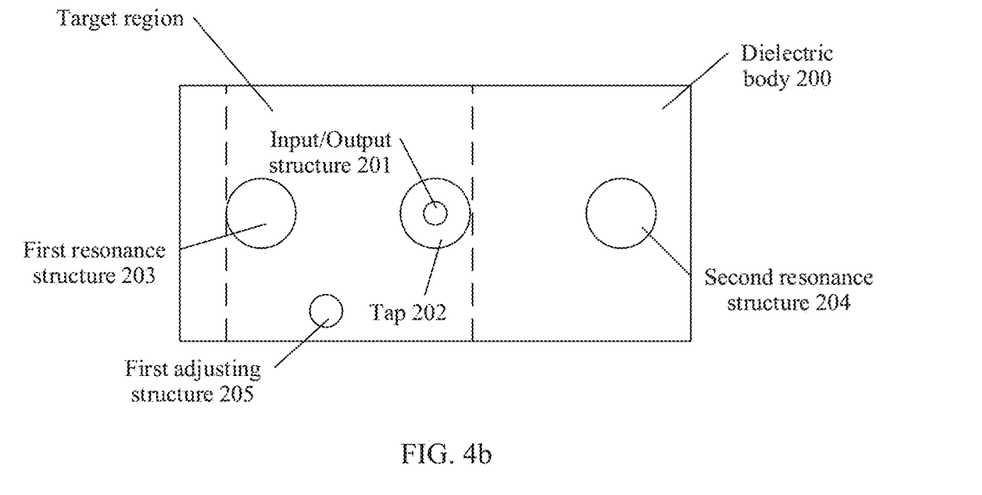
FIG. 4b is a schematic planar diagram of a target region in a dielectric duplexer.

Referring to FIG. 4b, using the first adjusting structure 205 as an example, if the first adjusting structure 205 is provided in a target region surrounded by dashed lines in FIG. 4b, it can be considered that the first adjusting structure 205 is located between the tap 202 and the first resonance structure 203. In addition, a shorter distance between the first adjusting structure and a middle point of a connecting line between the tap and the first resonance structure indicates larger signal coupling between the tap and the first resonator. Similarly, the foregoing description is also applicable to the second adjusting structure.

Figure 4C:
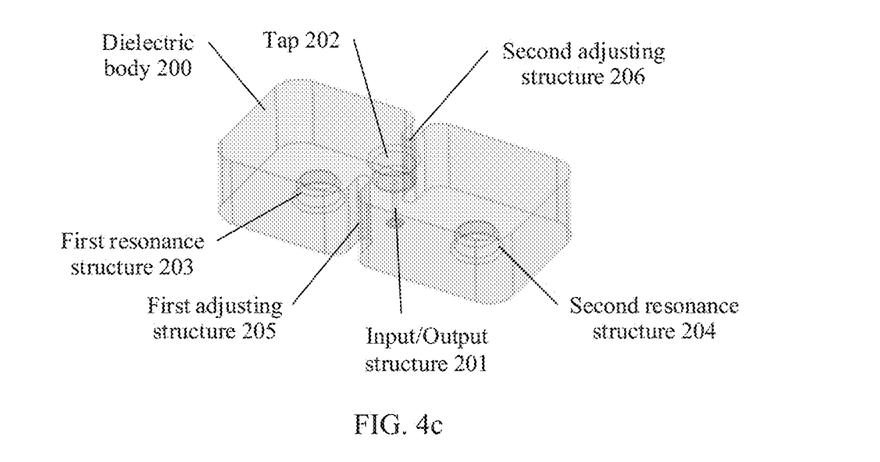
FIG. 4c is a schematic structural diagram of another dielectric duplexer according to an embodiment of this application.

Optionally, referring to FIG. 4c, a first adjusting structure 205 and a second adjusting structure 206 are provided on the dielectric body 200. The first adjusting structure 205 and the second adjusting structure 206 are cavities provided on the dielectric body 200, and the first adjusting structure 205 and the second adjusting structure 206 are disposed on a surface different from surfaces on which the input/output structure 201, the first resonance structure 203, and the second resonance structure 204 are provided. Similarly, the first adjusting structure 205 is located between the tap 202 and the first resonance structure 203. The second adjusting structure 206 is located between the tap 202 and the second resonance structure 204. The first adjusting structure 205 is configured to adjust the signal coupling between the tap 202 and the first resonator. The second adjusting structure 206 is configured to adjust the signal coupling between the tap 202 and the second resonator. It may be understood that, based on the first adjusting structure and the second adjusting structure shown in FIG. 4c, if the first adjusting structure 205 is provided in the target region surrounded by the dashed lines in FIG. 4b, it can be considered that the first adjusting structure 205 is located between the tap 202 and the first resonance structure 203. Similarly, the foregoing description is also applicable to the second adjusting structure.

It should be noted that, using the first adjusting structure as an example, a larger depth of the first adjusting structure indicates larger signal coupling between the tap and the first resonator, a larger aperture of the first adjusting structure on the dielectric body indicates larger signal coupling between the tap and the first resonator, and a shorter distance between the first adjusting structure and a middle point of a connecting line between the tap and the first resonance structure indicates larger signal coupling between the tap and the first resonator. Similarly, the foregoing description is also applicable to the second adjusting structure.

Figure 4D:
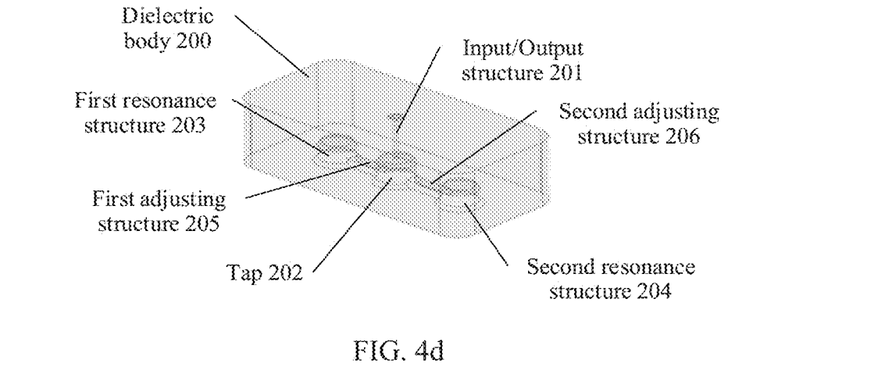
FIG. 4d is a schematic structural diagram of another dielectric duplexer according to an embodiment of this application.

Optionally, referring to FIG. 4d, the first adjusting structure 205 and the second adjusting structure 206 are provided on the dielectric body 200. The first adjusting structure 205 is a first through groove provided on the dielectric body 200. The second adjusting structure 206 is a second through groove provided on the dielectric body 200. The first through groove is in communication with the tap 202 and the first resonance structure 203, and the second through groove is in communication with the tap 202 and the second resonance structure 204.

It should be noted that, the first adjusting structure and the second adjusting structure are both provided in each of the dielectric duplexers described in FIG. 4a, FIG. 4c, and FIG. 4d. In addition, only the first adjusting structure or only the second adjusting structure may be provided in a dielectric duplexer. This is not specifically limited herein.

It should be noted that, the first adjusting structure and the second adjusting structure in each of the dielectric duplexers described in FIG. 4a, FIG. 4c, and FIG. 4d use a same structural design. In addition, the first adjusting structure and the second adjusting structure may alternatively use different structural designs. For example, the first adjusting structure uses the structural design in FIG. 4a, and the second adjusting structure uses the structural design in FIG. 4c or FIG. 4d, or the first adjusting structure uses the structural design in FIG. 4b and the second adjusting structure uses the structural design in FIG. 4a or FIG. 4d, or the first adjusting structure uses the structural design in FIG. 4d and the second adjusting structure uses the structural design in FIG. 4a or FIG. 4c.

Figure 4E:
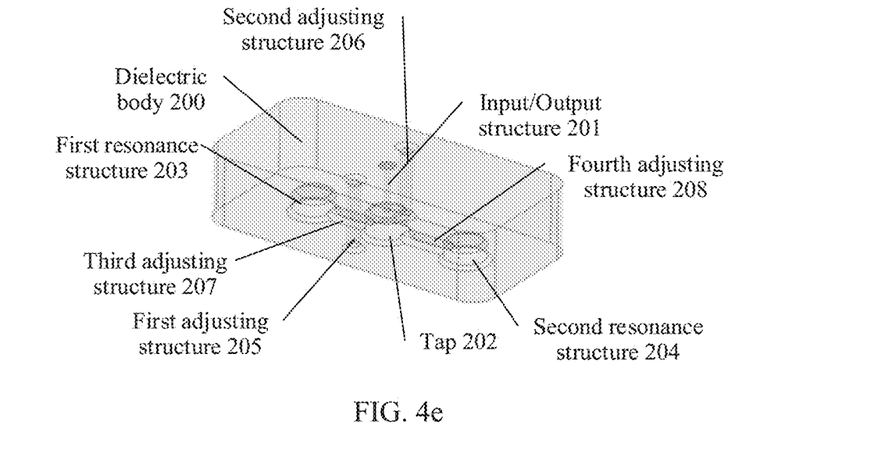
FIG. 4e is a schematic structural diagram of another dielectric duplexer according to an embodiment of this application.

It should be noted that, in each of the dielectric duplexers described in FIG. 4a, FIG. 4c, and FIG. 4d, only the first adjusting structure is configured to adjust the signal coupling between the tap and the first resonator, and only the second adjusting structure is configured to adjust the signal coupling between the tap and the second resonator. Based on this, more adjusting structures may be further provided in the dielectric duplexer, and are respectively configured to adjust the signal coupling between the tap and the first resonator and the signal coupling between the tap and the second resonator. A quantity of adjusting structures is not specifically limited herein. For example, referring to FIG. 4e, the first adjusting structure 205 and a third adjusting structure 207 are configured to adjust the signal coupling between the tap and the first resonator, and the second adjusting structure 206 and a fourth adjusting structure 208 are configured to adjust the signal coupling between the tap and the second resonator. The first adjusting structure 205 and the second adjusting structure 206 are of a through hole structure. The third adjusting structure 207 and the fourth adjusting structure 208 are of a through groove structure. Certainly, specific structural forms of the foregoing adjusting structures may be transformed with reference to FIG. 4a, FIG. 4c, and FIG. 4d. Details are not described herein again. In this embodiment, if the foregoing tap, first adjusting structure, and second adjusting structure are insufficient to make the signal coupling between the tap and the first resonator or the signal coupling between the tap and the second resonator reach an expectation, the signal coupling between the tap and the first resonator or the signal coupling between the tap and the second resonator may be further adjusted by adding the third adjusting structure and the fourth adjusting structure. This improves expandability of this solution.

Figure 5A:
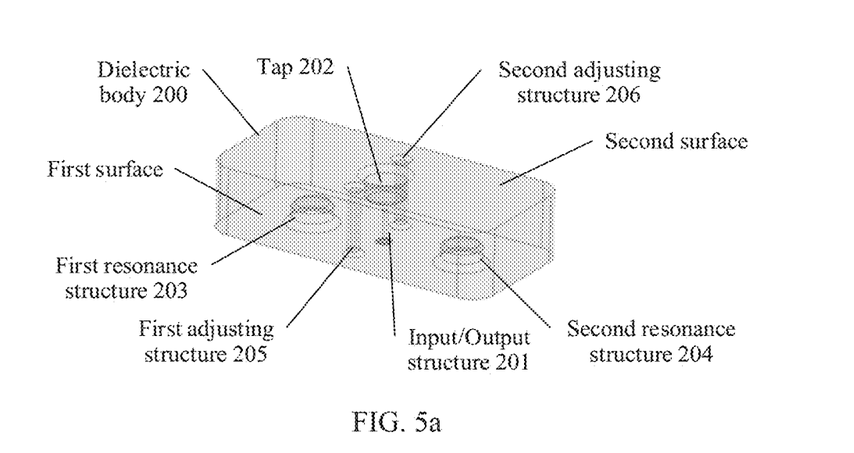
FIG. 5a is a schematic structural diagram showing that a tap and resonance structures in a dielectric duplexer are provided on different surfaces.
Figure 5B:
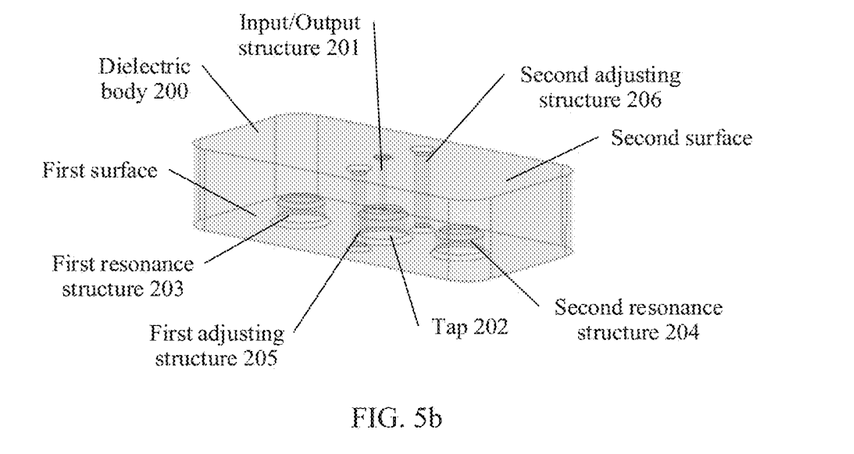
FIG. 5b is a schematic structural diagram showing that a tap and resonance structures in a dielectric duplexer are provided on a same surface.

Optionally, the tap 202, the first resonance structure 203, and the second resonance structure 204 in this embodiment may be provided on a same surface of the dielectric body 200, or on different surfaces of the dielectric body 200. Specifically, the input/output structure 201 may be provided on a first surface of the dielectric body 200, the tap 202 is provided on a second surface of the dielectric body 200, the first resonance structure 203 is provided on the first surface or the second surface, and the second resonance structure 204 is provided on the first surface or the second surface. The first surface is parallel to the second surface. For example, referring to FIG. 5a, the input/output structure 201 is provided on the first surface of the dielectric body 200, the tap 202 is provided on the second surface of the dielectric body 200, and the first resonance structure 203 and the second resonance structure 204 are both provided on the first surface of the dielectric body 200. Alternatively, referring to FIG. 5b, the input/output structure 201 is provided on the first surface of the dielectric body 200, the tap 202 is provided on the second surface of the dielectric body 200, and the first resonance structure 203 and the second resonance structure 204 are both provided on the second surface of the dielectric body 200. It may be understood that, other combinations are also transformations based on FIG. 5a and FIG. 5b, and are not listed one by one herein.

Figure 6:
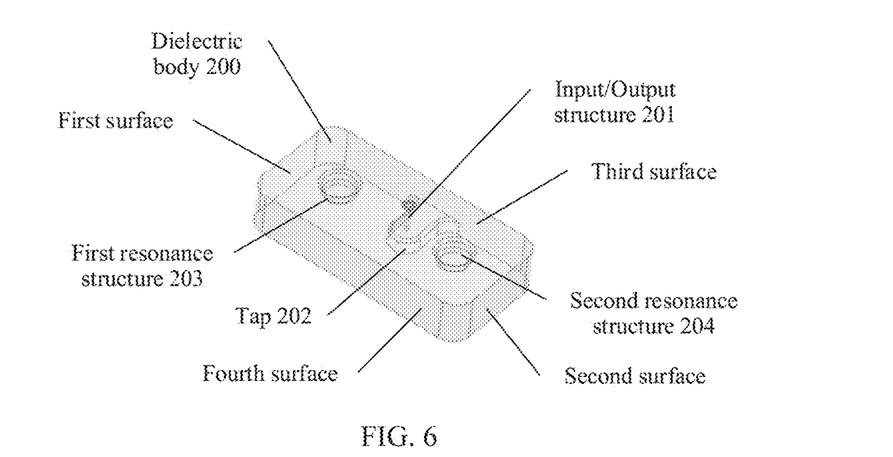
FIG. 6 is a schematic structural diagram of another dielectric duplexer according to an embodiment of this application.

Optionally, the input/output structure 201 may be provided on the first surface of the dielectric body 200, the first resonance structure 203 is provided on the first surface or the second surface, and the second resonance structure 204 is provided on the first surface or the second surface. Differently, the tap 202 is provided on the second surface of the dielectric body 200 and the tap 202 is in communication with a third surface or a fourth surface of the dielectric body 200. The third surface and the fourth surface are perpendicular to the first surface. For example, referring to FIG. 6, the tap 202 may be a cavity in communication with the second surface and the third surface. To be specific, a structure of the tap may start to be hollowed out along the second surface, and is further hollowed out toward the third surface, to form a cavity structure in a shape similar to "L".

Optionally, based on the structure of any dielectric duplexer described above, the tap 202 may or may not be in communication with the input/output structure 201. Considering from a perspective of production and processing, communication between the tap 202 and the input/output structure 201 more facilitates processing.

Figure 7:
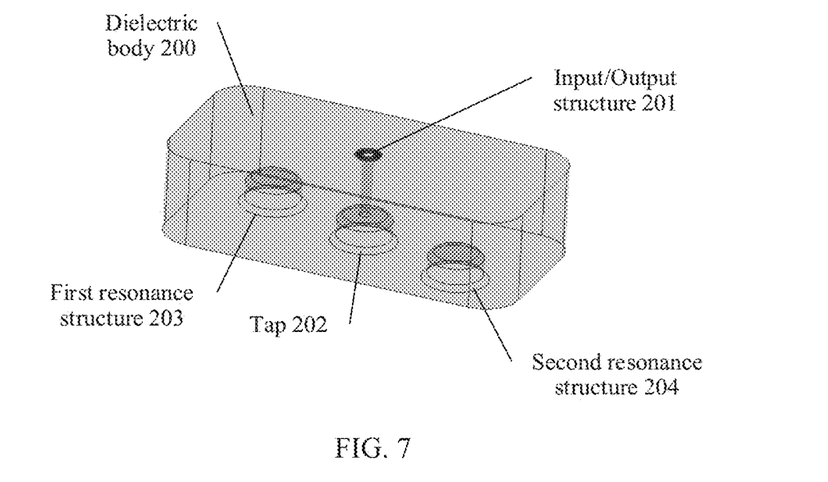
FIG. 7 is a schematic structural diagram of another dielectric duplexer according to an embodiment of this application.

Optionally, there may be a plurality of manners in which the first resonance structure 203, the second resonance structure 204, and the tap 202 are arranged. For example, as shown in FIG. 2, the first resonance structure 203, the second resonance structure 204, and the tap 202 may be arranged in a straight line, or as shown in FIG. 7, the first resonance structure 203, the second resonance structure 204, and the tap 202 may be arranged in an oblique line, or the first resonance structure 203, the second resonance structure 204, and the tap 202 may not be arranged in a straight line. This is not specifically limited herein.

Figure 8:
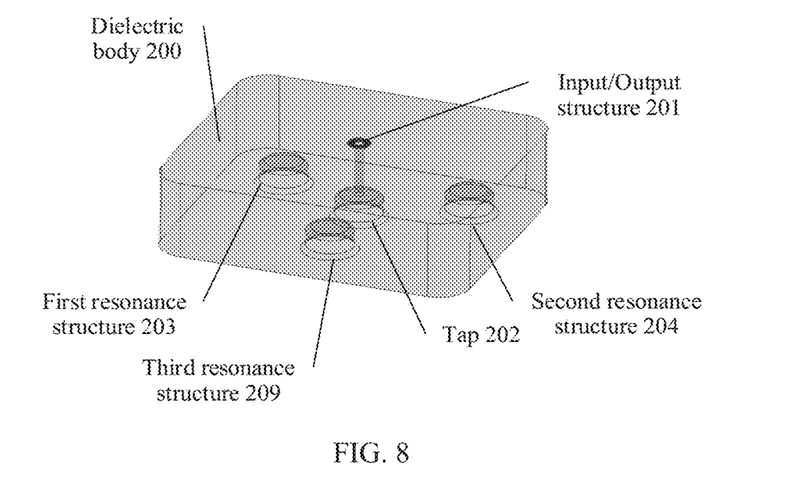
FIG. 8 is a schematic structural diagram of another dielectric multiplexer according to an embodiment of this application.

Optionally, as shown in FIG. 8, in addition to the first resonance structure 203 and the second resonance structure 204, a third resonance structure 209 may be further arranged in the dielectric duplexer, to form allocation or combination of more than two paths of signals. It may be understood that, a multiplexing manner of more than two paths should belong to the protection scope of this patent.

Figure 9:
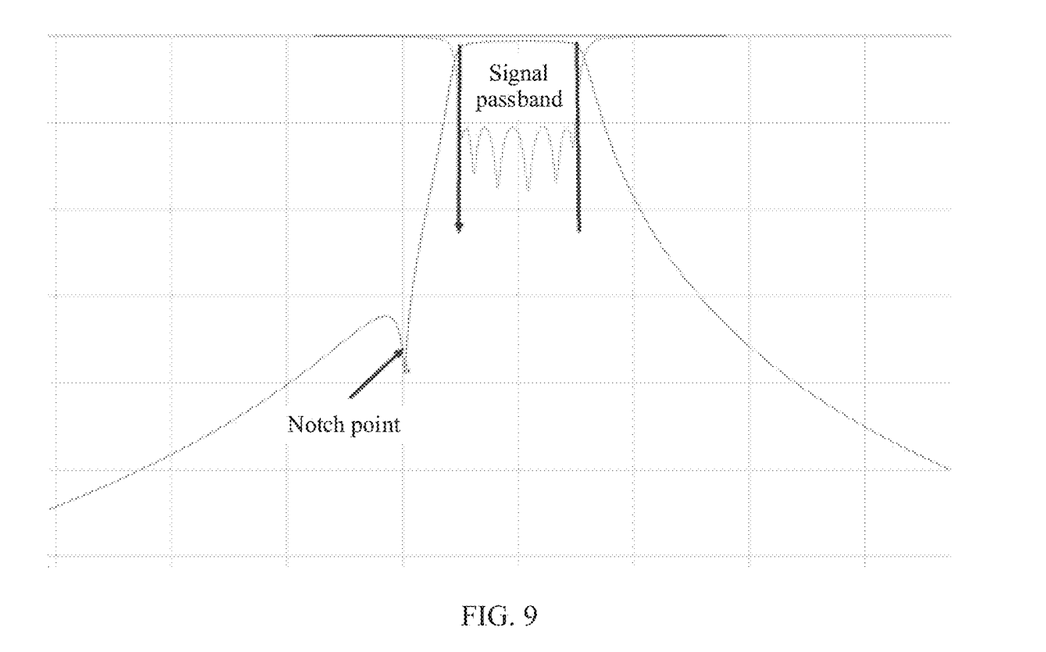
FIG. 9 is a schematic diagram of outband suppression on a signal passband of a resonator according to an embodiment of this application.

It should be noted that, in addition to a filtering function, the first resonator and the second resonator further have an outband suppression function. Specifically, as shown in FIG. 9, existence of the first resonator may enable generation of a notch point outside a signal passband of the second resonator, to improve an outband suppression effect for the signal passband of the second resonator. Similarly, existence of the second resonator may enable generation of a notch point outside a signal passband of the first resonator, to improve an outband suppression effect for the signal passband of the first resonator.

It may be understood that, based on the structure shown in FIG. 8, a third resonator may consist of the third resonance structure 209 and the dielectric body around the third resonance structure 209. Existence of the third resonator may improve an outband suppression effect for the signal passbands of the first resonator and the second resonator. To be specific, one resonator in the dielectric duplexer can improve an outband suppression effect for a signal passband of another resonator.

It should be noted that, a core of the tap structure in the embodiments of this application is used for separation and combination of two paths of signals. Transformation performed based on a structure of the dielectric duplexer based on this logical thought falls within the protection scope of this patent.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:
1. A dielectric duplexer, comprising:
a dielectric body, wherein an input/output structure, a tap, a first resonance structure, and a second resonance structure are provided on the dielectric body, wherein the tap, the input/output structure, the first resonance structure, and the second resonance structure are all cavities provided on surfaces of the dielectric body, wherein the tap and the input/output structure are provided on different surfaces of the dielectric body, wherein the tap and the input/output structure are located between the first resonance structure and the second resonance structure, wherein a first resonator consists of the first resonance structure and the dielectric body around the first resonance structure, wherein a second resonator consists of the second resonance structure and the dielectric body around the second resonance structure, and wherein:
a conducting layer covers the surfaces of the dielectric body, including the input/output structure, the tap, the first resonance structure, and the second resonance structure, wherein the conducting layer does not cover a region around the input/output structure;
the input/output structure is configured to input a signal or output a signal;
the tap is configured to couple a signal from the input/output structure to the first resonator and the second resonator, or the tap is configured to couple a signal from the first resonator and a signal from the second resonator to the input/output structure; and
the first resonator and the second resonator are configured to filter a signal.

2. The dielectric duplexer according to claim 1, wherein resonance frequencies of the first resonator and the second resonator are different.

3. The dielectric duplexer according to claim 1, wherein:
the tap is configured to couple an input signal of the input/output structure to the first resonator and the second resonator;
the first resonator is configured to filter the input signal to obtain a first signal; and
the second resonator is configured to filter the input signal to obtain a second signal, wherein frequencies of the second signal and the first signal are different.

4. The dielectric duplexer according to claim 1, wherein:
the first resonator is configured to obtain a third signal;
the second resonator is configured to obtain a fourth signal, wherein frequencies of the fourth signal and the third signal are different;
the tap is configured to couple the third signal and the fourth signal to the input/output structure; and
the input/output structure is configured to output the third signal and the fourth signal.

5. The dielectric duplexer according to claim 1, wherein the input/output structure is provided on a first surface of the dielectric body, wherein the tap is provided on a second surface of the dielectric body, wherein the first resonance structure is provided on the first surface or the second surface, wherein the second resonance structure is provided on the first surface or the second surface, and wherein the first surface is parallel to the second surface.

6. The dielectric duplexer according to claim 5, wherein the tap is in communication with a third surface or a fourth surface of the dielectric body, and wherein the third surface and the fourth surface are perpendicular to the first surface.

7. The dielectric duplexer according to claim 1, wherein at least one adjusting structure is further provided on the dielectric body, and the at least one adjusting structure is configured to adjust at least one of signal coupling between the tap and the first resonator or signal coupling between the tap and the second resonator.

8. The dielectric duplexer according to claim 7, wherein at least one of:
the at least one adjusting structure comprises a first adjusting structure, the first adjusting structure is located between the tap and the first resonance structure, and the first adjusting structure is configured to adjust the signal coupling between the tap and the first resonator; or
the at least one adjusting structure comprises a second adjusting structure, the second adjusting structure is located between the tap and the second resonance structure, and the second adjusting structure is configured to adjust the signal coupling between the tap and the second resonator.

9. The dielectric duplexer according to claim 8, wherein:
the first adjusting structure is a through hole provided on the dielectric body;
the first adjusting structure is a cavity provided on the dielectric body, and the first adjusting structure is provided on a surface different from the surfaces on which the input/output structure, the first resonance structure, and the second resonance structure are provided; or
the first adjusting structure is a first through groove provided on the dielectric body, wherein the first through groove is in communication with the tap and the first resonance structure.

10. The dielectric duplexer according to claim 8, wherein:
the second adjusting structure is a through hole provided on the dielectric body;
the second adjusting structure is a cavity provided on the dielectric body, and the second adjusting structure is provided on a surface different from the surfaces on which the input/output structure, the first resonance structure, and the second resonance structure are provided; or
the second adjusting structure is a second through groove provided on the dielectric body, wherein the second through groove is in communication with the tap and the second resonance structure.

11. The dielectric duplexer according to claim 1, wherein the tap is in communication with the input/output structure.

12. The dielectric duplexer according to claim 1, wherein:
the first resonator is further configured to suppress a signal outside a signal passband of the second resonator; and
the second resonator is further configured to suppress a signal outside a signal passband of the first resonator.

13. A communications apparatus, wherein the communications apparatus comprises a dielectric duplexer, and wherein the dielectric duplexer comprises:
a dielectric body, wherein an input/output structure, a tap, a first resonance structure, and a second resonance structure are provided on the dielectric body, wherein the tap, the input/output structure, the first resonance structure, and the second resonance structure are all cavities provided on surfaces of the dielectric body, wherein the tap and the input/output structure are provided on different surfaces of the dielectric body, wherein the tap and the input/output structure are located between the first resonance structure and the second resonance structure, wherein a first resonator consists of the first resonance structure and the dielectric body around the first resonance structure, wherein a second resonator consists of the second resonance structure and the dielectric body around the second resonance structure, and wherein:
a conducting layer covers the surfaces of the dielectric body, including the input/output structure, the tap, the first resonance structure, and the second resonance structure, wherein the conducting layer does not cover a region around the input/output structure;
the input/output structure is configured to input a signal or output a signal;
the tap is configured to couple a signal from the input/output structure to the first resonator and the second resonator, or the tap is configured to couple a signal from the first resonator and a signal from the second resonator to the input/output structure; and the first resonator and the second resonator are configured to filter a signal.

14. The communications apparatus according to claim 13, wherein resonance frequencies of the first resonator and the second resonator are different.

15. The communications apparatus according to claim 13, wherein:

the tap is configured to couple an input signal of the input/output structure to the first resonator and the second resonator;

the first resonator is configured to filter the input signal to obtain a first signal; and the second resonator is configured to filter the input signal to obtain a second signal, wherein frequencies of the second signal and the first signal are different.

16. The communications apparatus according to claim 13, wherein:

the first resonator is configured to obtain a third signal;

the second resonator is configured to obtain a fourth signal, wherein frequencies of the fourth signal and the third signal are different;

the tap is configured to couple the third signal and the fourth signal to the input/output structure; and the input/output structure is configured to output the third signal and the fourth signal.

17. The communications apparatus according to claim 13, wherein the input/output structure is provided on a first surface of the dielectric body, wherein the tap is provided on a second surface of the dielectric body, wherein the first resonance structure is provided on the first surface or the second surface, wherein the second resonance structure is provided on the first surface or the second surface, and wherein the first surface is parallel to the second surface.

18. The communications apparatus according to claim 17, wherein the tap is in communication with a third surface or a fourth surface of the dielectric body, and wherein the third surface and the fourth surface are perpendicular to the first surface.

19. The communications apparatus according to claim 13, wherein at least one adjusting structure is further provided on the dielectric body, and the at least one adjusting structure is configured to adjust at least one of signal coupling between the tap and the first resonator or signal coupling between the tap and the second resonator.

20. The communications apparatus according to claim 13, wherein the tap is in communication with the input/output structure.

* * * * *

UNITED STATES PATENT AND TRADEMARK OFFICE
CERTIFICATE OF CORRECTION

| | | |
|---|---|---|
| PATENT NO. | : 11,978,940 B2 | Page 1 of 1 |
| APPLICATION NO. | : 17/357696 | |
| DATED | : May 7, 2024 | |
| INVENTOR(S) | : Dan Liang, Xiaofeng Zhang and Guoshuai Zhao | |

It is certified that error appears in the above-identified patent and that said Letters Patent is hereby corrected as shown below:

On the Title Page

In Column 1 (Item (30) Foreign Application Priority Data), In Line 1, Delete "(WO)" and insert -- (CN) --.

Signed and Sealed this
Twenty-ninth Day of October, 2024

Katherine Kelly Vidal
*Director of the United States Patent and Trademark Office*